(12) United States Patent
Nickerson

(10) Patent No.: US 8,574,121 B1
(45) Date of Patent: Nov. 5, 2013

(54) PARK DISENGAGEMENT CLUNK MITIGATION

(71) Applicant: Ford Global Technologies, LLC, Dearborn, MI (US)

(72) Inventor: Kurt H. Nickerson, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/633,260

(22) Filed: Oct. 2, 2012

(51) Int. Cl.
*B60W 10/10* (2012.01)

(52) U.S. Cl.
USPC .................................................. 477/34

(58) Field of Classification Search
USPC .................. 477/34, 79, 97; 475/900
See application file for complete search history.

(56) References Cited

U.S. PATENT DOCUMENTS

| | | | | |
|---|---|---|---|---|
| 5,951,433 | A | * | 9/1999 | Tsukamoto et al. .......... 475/281 |
| 2004/0266583 | A1 | * | 12/2004 | Henneken et al. ............. 477/34 |
| 2009/0062064 | A1 | * | 3/2009 | Kamada et al. ................ 477/34 |

\* cited by examiner

*Primary Examiner* — Edwin A Young
(74) *Attorney, Agent, or Firm* — James Dottavio; MacMillan, Sobanski & Todd, LLC

(57) ABSTRACT

A method for controlling a transmission gearshift includes engaging control elements whose engagement is required for operation in first gear and reverse gear without grounding the transmission's input, grounding said input provided a range other than park is selected, grounding the transmission's output, releasing the input, producing first gear provided first gear is selected, and producing reverse gear provided reverse gear is selected.

12 Claims, 2 Drawing Sheets

| CLUTCH APPLICATION SCHEDULE | | | | | | |
|---|---|---|---|---|---|---|
| | Brk A 64 | Brk B 66 | Clt C 68 | Clt D 72 | Clt E 74 | Clt F 76 |
| 1st | X | X | | (O) | X | |
| 2nd | X | X | X | X | | |
| 3rd | X | | X | X | X | |
| 4th | X | | X | X | | X |
| 5th | X | | X | | X | X |
| 6th | X | | | X | X | X |
| 7th | | | X | X | X | X |
| 8th | | X | | X | X | X |
| 9th | | X | X | | X | X |
| 10th | | X | X | X | | X |
| Rev | X | X | | X | | X |

PARK DISENGAGEMENT CLUNK MITIGATION

BACKGROUND OF THE INVENTION

1. Field of the Invention

This invention relates generally to a method for mitigating park disengagement clunk in an automatic transmission for a motor vehicle.

2. Description of the Prior Art

Disengagement of the park system in automatic transmission vehicles can result in objectionable audible and tactile disturbance to the driver if the vehicle is parked on a grade or up against a curb, such that the park system is maintaining a significant amount of stored strain energy in the vehicle's driveline. This disturbance is called "clunk." The objectionable disturbance comes from the nearly instantaneous release of this energy when park is disengaged.

Reliance on the use of clutches to ground the transmission output shaft but not the transmission input prior to park disengagement are deficient in transmissions having a kinematic assembly that prevents the output from being grounded with the input free through clutch application.

This deficiency results in a tactile disturbance to the driver when the transmission is grounded or tied-up because torque is transmitted from input to output during this process.

SUMMARY OF THE INVENTION

A method for controlling a transmission gearshift includes engaging control elements whose engagement is required for operation in first gear and reverse gear without grounding the transmission's input, grounding said input provided a range other than park is selected, grounding the transmission's output, releasing the input, producing first gear provided first gear is selected, and producing reverse gear provided reverse gear is selected.

The method minimizes clunk and improves quality of first gear and reverse gear disengagement from the park state, providing less tactile disturbance to the driver.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figures 1, 2:
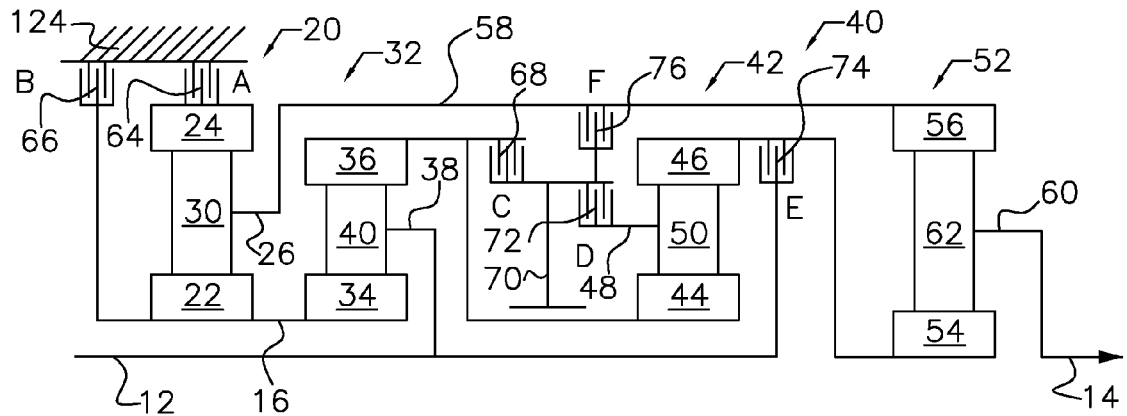
FIG. 1 is a schematic diagram showing a side view of the kinematic assembly for an automatic transmission for a motor vehicle.
FIG. 2 is a table showing the engaged and disengage states of the transmission control elements for each of the forward gears and reverse gear.

The assembly 10 FIG. 1 includes an input 12 connected to an engine or other power source; output 14; intermediate shafts 16, 18; a first planetary gear set 20 having a first sun gear 22, a first ring gear 24, a first carrier 26; and a set of planet pinions 30 supported on carrier 26 and in continuous meshing engagement with the sun gear 22 and the ring gear 24.

A second planetary gear set 32 includes a second sun gear 34 fixedly coupled to sun gear 22; a second ring gear 36; a second carrier 38 fixedly coupled to the input 12; and a set of planet pinions 40 in supported on carrier 38 and in continuous meshing engagement with sun gear 34 and ring gear 36.

A third planetary gear set 42 includes a third sun gear 44 fixedly coupled to ring gear 36; a third ring gear 46; a third carrier 48; and a set of planet pinions 50 supported on carrier 48 and in continuous meshing engagement with sun gear 44 and ring gear 46.

A fourth planetary gear set 52 includes a fourth sun gear 54 fixedly coupled to ring gear 46; a fourth ring gear 56 fixedly coupled by a shell 58 to carrier 26; a fourth carrier 60 fixedly coupled to output 14; and a set of planet gears 62 supported on carrier 60 and in continuous meshing engagement with sun gear 54 and ring gear 56.

A first brake 64 selectively holds ring gear 24 against rotation.

A second brake 66 selectively holds sun gears 22, 34 against rotation on the transmission case 124.

A first clutch 68 selectively couples ring gear 36 to a clutch housing 70 rotation also on the transmission case 124.

A second clutch 72 selectively couples carrier 48 to clutch housing 70.

A third clutch 74 selectively couples ring gear 46 to input 12.

A fourth clutch 76 selectively couples shell 58 to clutch housing.

The table of FIG. 2 shows the engaged and disengaged states of the transmission control elements, i.e., brakes 64, 66 and clutches 68, 72, 74, 76, for each of the forward gears, first through tenth, and reverse gear. In the table, "X" indicates engaged, a blank indicates disengaged, and "O" indicates the state may be either engaged or disengaged.

Figure 3:
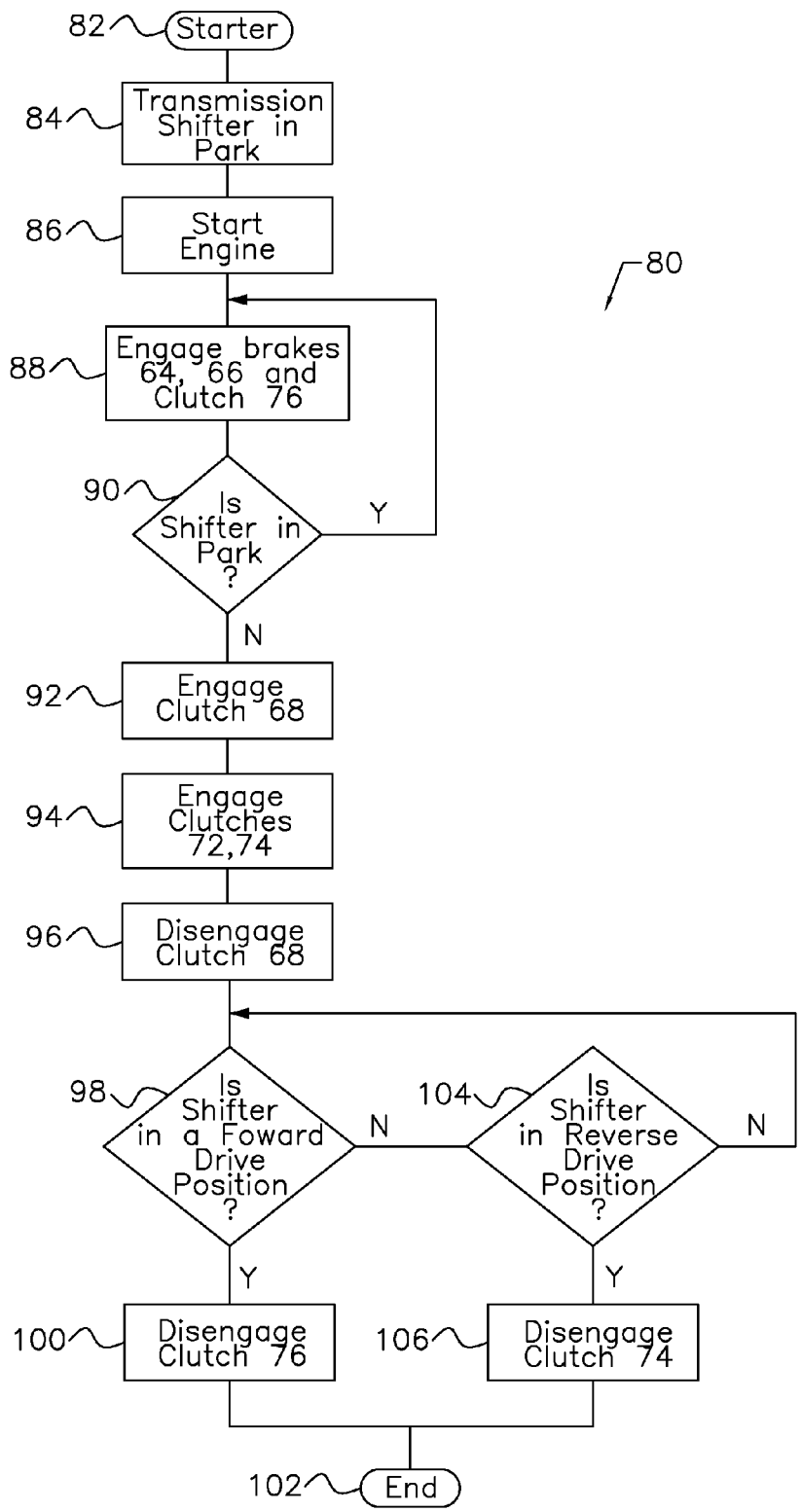
FIG. 3 is a diagram representing the logic flow of an algorithm for controlling the transition of an automatic transmission from a park range to operation in first gear or reverse gear.

As FIG. 3 shows execution of the algorithm 80 starts at step 82 with the vehicle's transmission range selector placed in the park position at 84.

At step 86 the vehicle's engine is started.

At step 88 brakes 64, 66 and clutch 76 are engaged to prepare for disengagement of the park brake and placement of the transmission hydraulic system in the other than the park state. Alternately step 88 would include engaging clutch 64, 66 and 68 but not clutch 76. When brakes 64, 66 are engaged, gear set 20 is locked-up, and sun gear 34 and shell 58 are held against rotation on the transmission case 124, without grounding the input 12. Engagement of clutch 76 is required for operation in reverse gear. Engagement of brakes 64, 66 is required for operation in first gear.

At step 90 a test is made to determine whether the range selector is in the park position. If the result of test 90 is positive, control returns to step 88.

If the result of test 90 is negative, at step 92 the input 12 is grounded by engaging clutch 68 (or engaging clutch 76 if clutch 68 were selected at step 88), but the output 14 is not grounded at this point. Then when clutch 68 is engaged, shell 58 is connected to ring gear 36, thereby locking-up gearset 32, whose carrier 38 is secured to input 12.

Then at step 94 clutch 72 and 74 are engaged to ground the transmission output 14 without providing any disturbance to the driveline because the input was grounded in step 92. Clutches 72 and 74 are also the control elements used to trigger the park servo to disengage. When brakes 64, 66 and clutch 68 are engaged, ring gear 56 of gearset 52 is held against rotation due to gearset 20 being locked and shell 58 being secured to carrier 26. Thereafter upon engaging clutch 72, sun gear 54 is connected to the grounded input 12, thereby grounding the output 14.

At step 96 clutch 68 is quickly disengaged to prepare for engagement of either first gear or reverse gear.

At step 98 a test is made to determine whether the range selector is in the drive range or first gear range. If the result of test 98 is positive, at step 100 clutch 76 is released, the transmission produces first gear, and the algorithm ends at step 102.

But if the result of test 98 is negative, at step 104 a test is made to determine whether the range selector is in the reverse range position. If the result of test 104 is negative control returns to step 98.

The neutral range is produced upon releasing brake 64 and clutches 74, and 76.

But if the result to test 104 is positive, at step 106 clutch 74 is released, the transmission produces reverse gear, and the algorithm ends at step 102.

Because first gear or reverse gear are engaged from a state where the transmission internal speeds are already zero, smooth engagement of first gear or reverse gear results.

In accordance with the provisions of the patent statutes, the preferred embodiment has been described. However, it should be noted that the alternate embodiments can be practiced otherwise than as specifically illustrated and described.

The invention claimed is:

1. A method for controlling a transmission gearshift, comprising:
   (a) without grounding an input of the transmission, engaging control elements whose engagement is required for operation in first gear and reverse gear;
   (b) grounding said input provided a range other than park is selected;
   (c) grounding an output of the transmission;
   (d) releasing said input;
   (e) producing first gear, provided first gear is selected;
   (f) producing reverse gear, provided reverse gear is selected.

2. The method of claim 1, wherein step (a) further comprises:
   engaging first and second brakes whose engagement is required for operation in first gear and reverse gear; and
   engaging a first clutch, whose engagement is required for operation in reverse gear and whose disengagement is required for operation in first gear.

3. The method of claim 2, wherein step (e) further comprises disengaging the first clutch.

4. The method of claim 1, wherein step (b) further comprises engaging a second clutch, whose engagement connects a grounded transmission component to said input through a locked gearset.

5. The method of claim 1, wherein step (c) further comprises:
   engaging a third clutch, whose engagement grounds said output and whose engagement is required for operation in first gear; and
   engaging a fourth clutch, whose engagement is required for operation in reverse gear.

6. The method of claim 5, wherein step (f) further comprises disengaging the third clutch.

7. A method for controlling a transmission gearshift, comprising:
   (a) grounding an input of the transmission, provided a range other than park is selected;
   (b) grounding an output of the transmission;
   (c) releasing said input;
   (d) producing first gear, provided first gear is selected;
   (e) producing reverse gear, provided reverse gear is selected.

8. The method of claim 7, further comprises:
   before executing step (a), engaging first and second brakes whose engagement is required for operation in first gear and reverse gear; and
   before executing step (a), engaging a first clutch, whose engagement is required for operation in reverse gear and whose disengagement is required for operation in first gear.

9. The method of claim 8, wherein step (d) further comprises disengaging the first clutch.

10. The method of claim 7, wherein step (a) further comprises engaging a second clutch, whose engagement connects a grounded transmission component to said input through a locked gearset.

11. The method of claim 7, wherein step (b) further comprises:
    engaging a third clutch, whose engagement grounds said output and whose engagement is required for operation in first gear; and
    engaging a fourth clutch, whose engagement is required for operation in reverse gear.

12. The method of claim 11, wherein step (e) further comprises disengaging the third clutch.

* * * * *